US010411286B2

(12) United States Patent
Lu et al.

(10) Patent No.: US 10,411,286 B2
(45) Date of Patent: Sep. 10, 2019

(54) ALKALI/OXIDANT BATTERY

(71) Applicant: Sharp Laboratories of America, Inc., Camas, WA (US)

(72) Inventors: Yuhao Lu, Vancouver, WA (US); Hidayat Kisdarjono, Vancouver, WA (US); Jong-Jan Lee, Camas, WA (US); David R. Evans, Beaverton, OR (US)

(73) Assignee: Sharp Laboratories of America, Inc., Vancouver, WA (US)

( * ) Notice: Subject to any disclaimer, the term of this patent is extended or adjusted under 35 U.S.C. 154(b) by 618 days.

(21) Appl. No.: 15/146,071

(22) Filed: May 4, 2016

(65) Prior Publication Data

US 2016/0268622 A1    Sep. 15, 2016

Related U.S. Application Data

(60) Division of application No. 14/092,048, filed on Nov. 27, 2013, now abandoned, which is a
(Continued)

(51) Int. Cl.
*H01M 8/18* (2006.01)
*H01M 4/52* (2010.01)
(Continued)

(52) U.S. Cl.
CPC ............. *H01M 8/188* (2013.01); *H01M 4/24* (2013.01); *H01M 4/248* (2013.01); *H01M 4/32* (2013.01);
(Continued)

(58) Field of Classification Search
None
See application file for complete search history.

(56) References Cited

U.S. PATENT DOCUMENTS

| 4,842,963 A | 6/1989 | Ross |
| 2005/0175894 A1 | 8/2005 | Visco et al. |

(Continued)

FOREIGN PATENT DOCUMENTS

| JP | 2007524204 | 8/2007 |
| JP | 2011-81971 | 4/2011 |
| WO | WO2005/083829 | 9/2005 |

OTHER PUBLICATIONS

K.M. Abraham, Z. Jiang, A polymer electrolyte-based rechargeable lithium/oxygen battery, Journal of the Electrochemical Society, 143 (1996) 1-5.
(Continued)

*Primary Examiner* — Barbara L Gilliam
*Assistant Examiner* — Nathanael T Zemui
(74) *Attorney, Agent, or Firm* — ScienBiziP, P.C.

(57) ABSTRACT

An alkali/oxidant battery is provided with an associated method of creating battery capacity. The battery is made from an anode including a reduced first alkali metal such as lithium (Li), sodium (Na), and potassium (K), when the battery is charged. The battery's catholyte includes an element, in the battery charged state, such as nickel oxyhydroxide (NiOOH), manganese(IV) (oxide $Mn^{(4+)}O_2$), or iron(III) oxyhydroxide $Fe^{(3+)}(OH)_3$, with the alkali metal hydroxide. An alkali metal ion permeable separator is interposed between the anolyte and the catholyte. For example, if the catholyte includes nickel(II) hydroxide $(Ni(OH)_2)$ in a battery discharged state, then it includes NiOOH in a battery charged state. To continue the example, the anolyte may include dissolved lithium ions $(Li^+)$ in a discharged state, with solid phase reduced Li formed on the anode in the battery charged state.

14 Claims, 7 Drawing Sheets

Related U.S. Application Data continuation-in-part of application No. 14/042,264, filed on Sep. 30, 2013, now abandoned, which is a continuation-in-part of application No. 13/564,015, filed on Aug. 1, 2012, now Pat. No. 9,537,192.

(51) Int. Cl.
| | | |
|---|---|---|
| *H01M 10/44* | (2006.01) | |
| *H01M 8/20* | (2006.01) | |
| *H01M 10/05* | (2010.01) | |
| *H01M 12/08* | (2006.01) | |
| *H01M 4/24* | (2006.01) | |
| *H01M 4/32* | (2006.01) | |
| *H01M 4/38* | (2006.01) | |
| *H01M 4/50* | (2010.01) | |
| *H01M 10/26* | (2006.01) | |
| *H01M 10/30* | (2006.01) | |
| *H01M 10/052* | (2010.01) | |
| *H01M 10/0525* | (2010.01) | |
| *H01M 10/0568* | (2010.01) | |
| *H01M 2/14* | (2006.01) | |
| *H01M 4/02* | (2006.01) | |

(52) U.S. Cl.
CPC .............. *H01M 4/382* (2013.01); *H01M 4/50* (2013.01); *H01M 4/52* (2013.01); *H01M 4/521* (2013.01); *H01M 4/523* (2013.01); *H01M 8/184* (2013.01); *H01M 8/20* (2013.01); *H01M 10/052* (2013.01); *H01M 10/0525* (2013.01); *H01M 10/0568* (2013.01); *H01M 10/26* (2013.01); *H01M 10/30* (2013.01); *H01M 10/44* (2013.01); *H01M 12/08* (2013.01); *H01M 2/14* (2013.01); *H01M 2004/027* (2013.01); *H01M 2004/028* (2013.01); *H01M 2300/0014* (2013.01); *H01M 2300/0025* (2013.01); *Y02E 60/128* (2013.01); *Y10T 29/49108* (2015.01)

(56) References Cited

U.S. PATENT DOCUMENTS

| | | |
|---|---|---|
| 2011/0189520 A1 | 8/2011 | Carter et al. |
| 2012/0135278 A1 | 5/2012 | Yoshie et al. |

OTHER PUBLICATIONS

Yuhao Lu, john B. goodenough, Youngsik Kim, Aqueous cathode for nextgeneration alkali-ion batteries, Journal of the American Chemical Society, 133 (2011) 5756-5759.

H. Li, Y. Wang, H. Na, H. Liu, H. Zhou, Rechargeable Ni—Li battery integrated aqueous/nonaqueous system, J. Am. Chem. Soc, 131 (2009) 15098-15099.

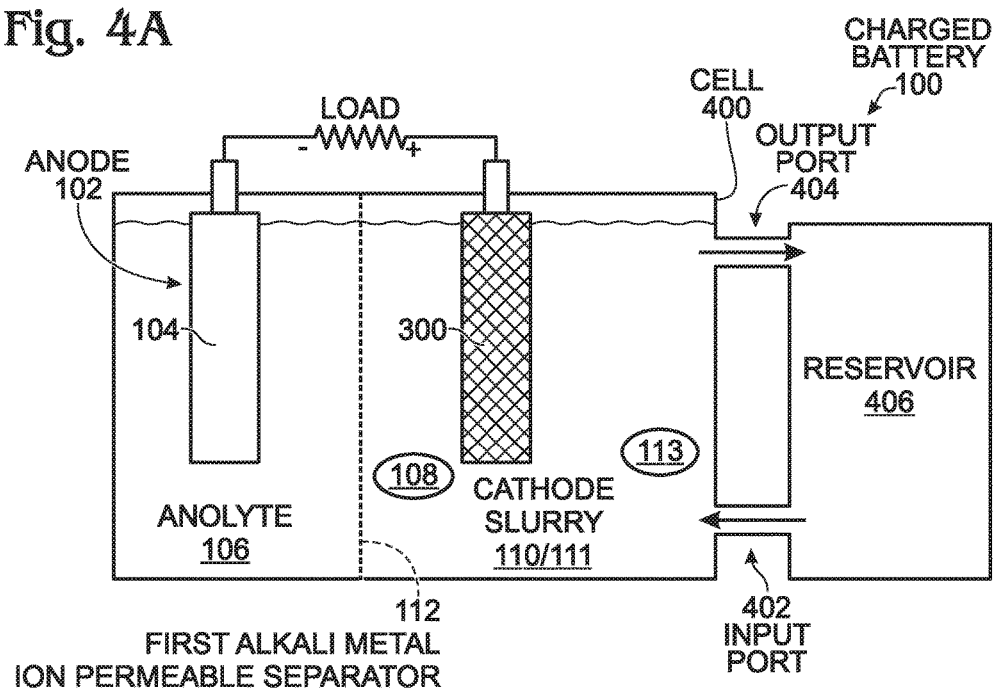
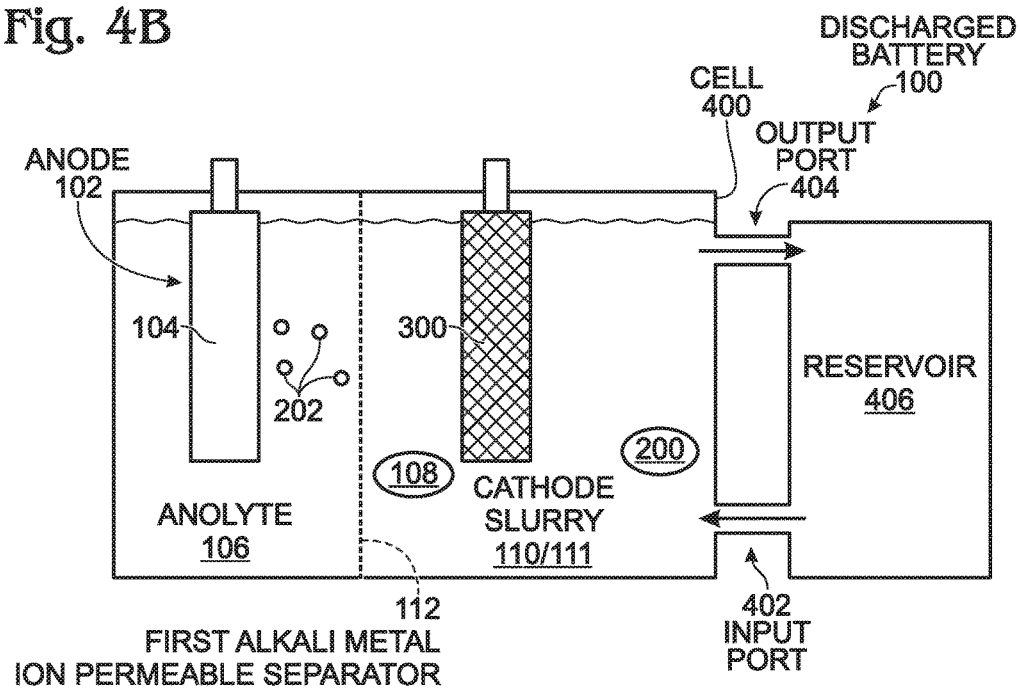

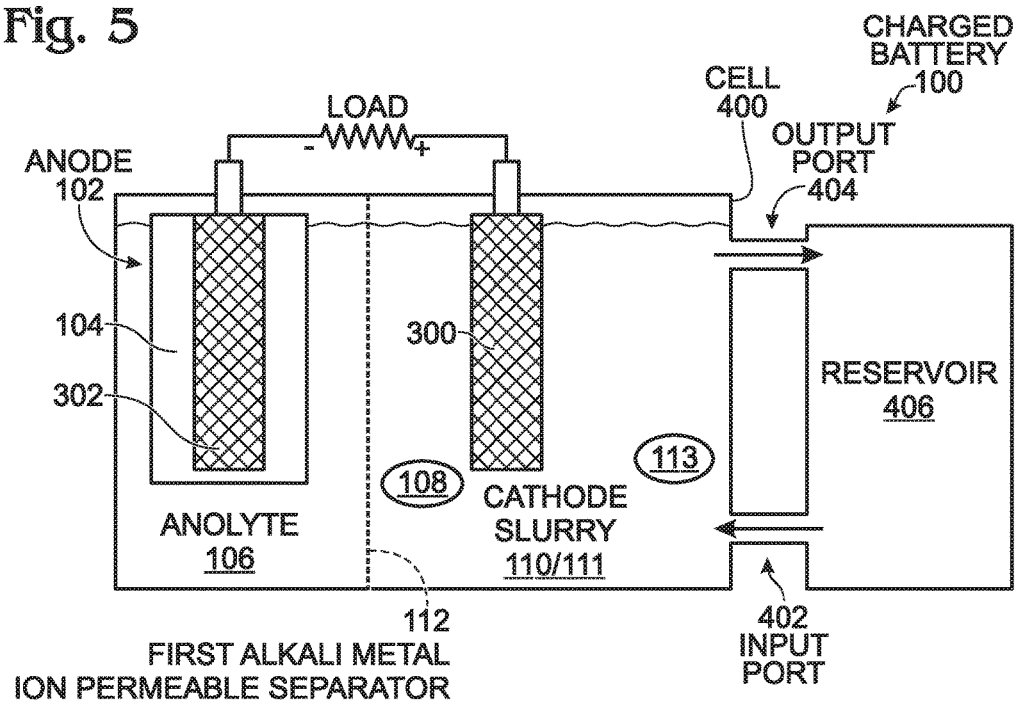
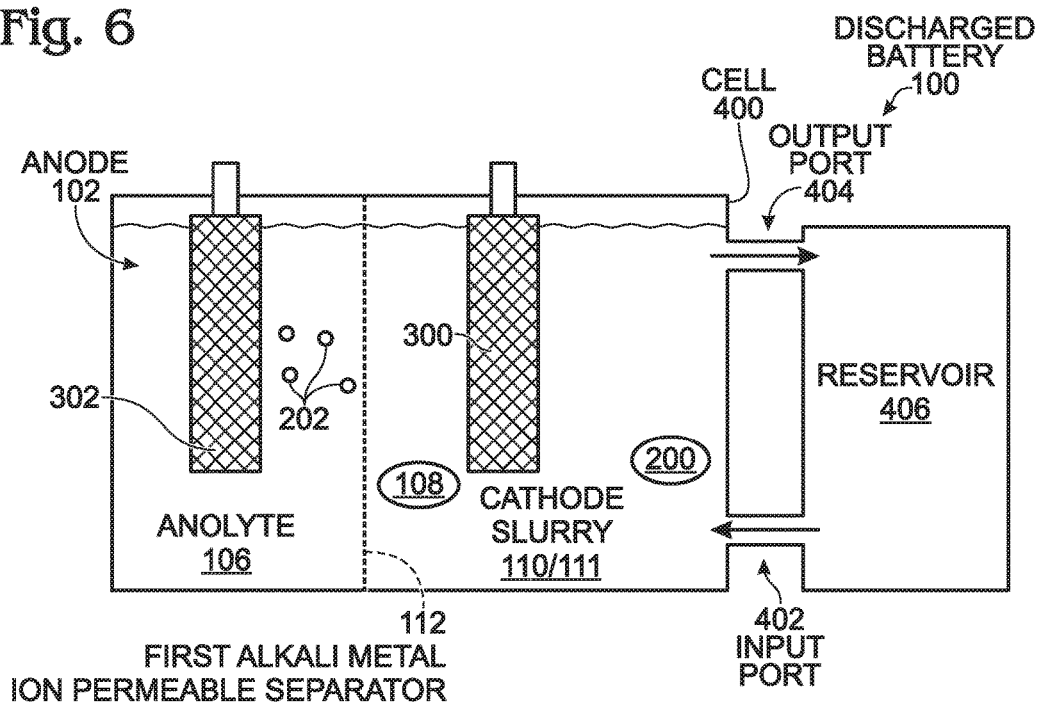

ALKALI/OXIDANT BATTERY

RELATED APPLICATION

The application is a Divisional of an application entitled, HIGH CAPACITY ALKALI/OXIDANT BATTERY, invented by Yuhao Lu et al., Ser. No. 14/092,048, filed Nov. 27, 2013;

which is a Continuation-in-Part of a pending application entitled, FLOW-THROUGH METAL BATTERY WITH ION EXCHANGE MEMBRANE, invented by Yuhao Lu et al., Ser. No. 14/042,264, filed on Sep. 30, 2013;

which is a Continuation-in-Part of a pending application entitled, BATTERY WITH LOW TEMPERATURE MOLTEN SALT (LTMS) CATHODE, invented by Yuhao Lu et al., Ser. No. 13/564,015, filed on Aug. 1, 2012. All these applications are incorporated herein by reference.

BACKGROUND OF THE INVENTION

1. Field of the Invention

This invention generally relates to electrochemical cells and, more particularly, to a battery formed from an alkali anode and cathode including nickel or iron.

2. Description of the Related Art

A battery is an electrochemical device in which electrons and ions commute between the anode and cathode to realize electrochemical reactions. The voltage and capacity of the battery are determined by the electrode materials. In a conventional battery, all the components including anode materials, cathode materials, separator, electrolyte, and current collectors are packed into a volume-fixed container. Its energy and capacity of are unchangeable as long as the battery is assembled. A flow-through battery consists of current collectors (electrodes) separated by an ion exchange membrane, while its anode and cathode materials are stored in separate storage tanks. The anode and cathode materials are circulated through the flow-through battery in which electrochemical reactions take place to deliver and to store energy. Therefore, the battery capacity and energy are determined by (1) electrode materials (anolyte and catholyte), (2) the concentrations of anolyte and catholyte, and (3) the volumes of anolyte and catholyte storage tanks. Conventional state-of-the-art anode and cathode materials typically react with an aqueous or non-aqueous solution (electrolyte) containing some redox couples.

In general, the use of metals as anode materials can achieve a high voltage in the battery while their low molecular weight provides a large capacity. For example, lithium has the most negative potential of −3.04 volts (V) vs. $H_2/H^+$ and the highest capacity of 3860 milliamp hours per gram (mAh/g). High voltage and large capacity lead to an overall high energy for the battery. In addition, sodium, potassium, magnesium, nickel, zinc, calcium, aluminum, etc. are good candidates as the anode materials in metal-ion batteries.

The state-of-the-art cathode materials focus on the metal-ion host compounds. Metal-ions can be extracted from the interstitial spaces of the electrode materials in the charge process and inserted into the materials during the discharge process. However, it is worth noting that the charge/discharge process severely distorts the lattice of the materials, which essentially destroys their structures following several cycles. Moreover, these cathode materials can only provide less than one tenth capacities of the metal anode materials. Therefore, new cathode materials need to be developed in order to (1) match the higher capacities of the anode materials and (2) exhibit long cycle lives for the metal-ion batteries.

In 1996, Abraham and Jiang reported a polymer electrolyte-based rechargeable lithium/oxygen battery in which oxygen was used as the cathode material[1]. Oxygen in air continuously flowed into the battery and provided a very high specific energy of 5200 watt hours per kilogram (Wh/kg). Nevertheless, the oxygen cathode has several disadvantages. Firstly, expensive electro-catalysts were used in the batteries to reduce the kinetic barrier for the oxygen reactions. Secondly, the sluggish electrochemical reactions of oxygen produce a large overpotential in the lithium/air battery. Thirdly, the lithium/air battery must maintain an open cathode to allow air access. Similarly, an oxygen cathode was also used in the zinc-air batteries[2].

In 2011, Lu and Goodenough revealed an aqueous cathode for a lithium ion battery[3]. They used aqueous solutions of water-soluble redox couples, for example, $Fe(CN)_6^{3-}/Fe(CN)_6^{4-}$ as the cathode. The lithium/aqueous cathode battery operated at ca. 3.4 volts in an ambient environment. The battery demonstrated a small overpotential, a high coulombic efficiency, and a long cycle life. However, water is an inert material in the electrochemical system, which reduces the specific capacity of the cathode. Although the design of a lithium/flow-through cathode battery can increase the capacity and energy, its volume must necessarily be large.

With the similar battery structure, $Ni(OH)_2$ was used as the cathode to match a lithium anode[4]. The $Li/Ni(OH)_2$ battery has to be charged so that $Ni(OH)_2$ can be oxidized to NiOOH along the reaction:

$$Ni(OH)_2 + OH^- = NiOOH + H_2O + e^-.$$

At the same time, the following reaction occurs:

$$Li^+ + e^- = Li$$

in which lithium-ions come are sourced from the electrolyte. Therefore, the battery capacity is limited by the Li-ion concentration in electrolytes, although $Ni(OH)_2$ experimentally demonstrate a high capacity of 260 mAh/g. The capacity advantage of the Li/Ni battery is limited by the Li-ion concentration in the electrolyte.

It would be advantageous if NiOOH could be used as the cathode material in a battery with a lithium anode, so that the capacity of a Li/Ni battery is determined by the amount of NiOOH in the cathode at fabrication.

[1] K. M. Abraham, Z. Jiang, "A polymer electrolyte-based rechargeable lithium/oxygen battery", Journal of the Electrochemical Society, 143 (1996) 1-5.

[2] Philip N. Ross, Jr., "Zinc electrode and rechargeable zinc-air battery", U.S. Pat. No. 4,842,963.

[3] Yuhao Lu, john B. Goodenough, Youngsik Kim, "Aqueous cathode for next generation alkali-ion batteries" Journal of the American Chemical Society, 133 (2011), 5756-5759.

[4] H. Li, Y. Wang, H. Na. H. Liu, H. Zhou, "Rechargeable Ni-Li battery integrated aqueous/nonaqueous system", J. Am. Chem. Soc, 131 (2009) 15098-15099.

[5] William C. Carter, Yet-Ming Chiang, "High energy density redox flow device", US 2011/0189520.

SUMMARY OF THE INVENTION

Disclosed herein is a lithium anode battery that uses nickel oxyhydroxide (NiOOH), manganese(IV) (oxide $Mn^{(4+)}O_2$), or iron(III) oxyhydroxide ($Fe^{(3+)}(OH)_3$) as the cathode material in an alkali metal anode battery. The cathode material may be fixed as a solid on a current collector and also can be made as a slurry catholyte, which flows through cathode side of the battery, permitting the battery to be rapidly charged using a mechanical (as opposed to an electrical/chemical) method.

Accordingly, an alkali/oxidant battery is provided. The battery is made from an anode including a reduced first alkali metal lithium (Li), sodium (Na), and potassium (K), when the battery is charged. The battery's cathode includes an element, in the battery charged state, such as NiOOH, $Mn^{(4+)}O_2$, or $Fe^{(3+)}(OH)_3$, with an alkali metal hydroxide in the catholyte. An alkali metal ion permeable separator is interposed between the anolyte and the catholyte. For example, if the cathode includes nickel(II) hydroxide (Ni$(OH)_2$) in a battery discharged state, then it includes NiOOH in a battery charged state. To continue the example, the anolyte may include dissolved lithium ions ($Li^+$) in a discharged state, with solid phase reduced. Li formed on the anode in the battery charged state.

In one aspect, the cathode and catholyte are the same element, formed a cathode slurry, with a cathode current collector submerged in the cathode slurry. In this aspect, a cell includes the anode, anolyte, and separator, and a cathode slurry reservoir connected to the cell input and output ports to supply an oxidized cathode slurry when the battery is electrically charged, or discharging under load, and a reduced cathode slurry when the battery is being electrically charged. Further, a plurality of cells may be connected in series or parallel electrical connections.

Additional details of the above-described battery and a method for creating alkali/oxidant battery capacity are provided below.

BRIEF DESCRIPTION OF THE DRAWINGS

FIGS. 4A and 4B are partial cross-sectional views of an alkali/oxidant battery where the catholyte and cathode are the same element, comprising a cathode slurry.

FIGS. 5 and 6 are partial cross-sectional views of an alternative alkali/oxidant battery using a cathode slurry.

DETAILED DESCRIPTION

Figure 1:
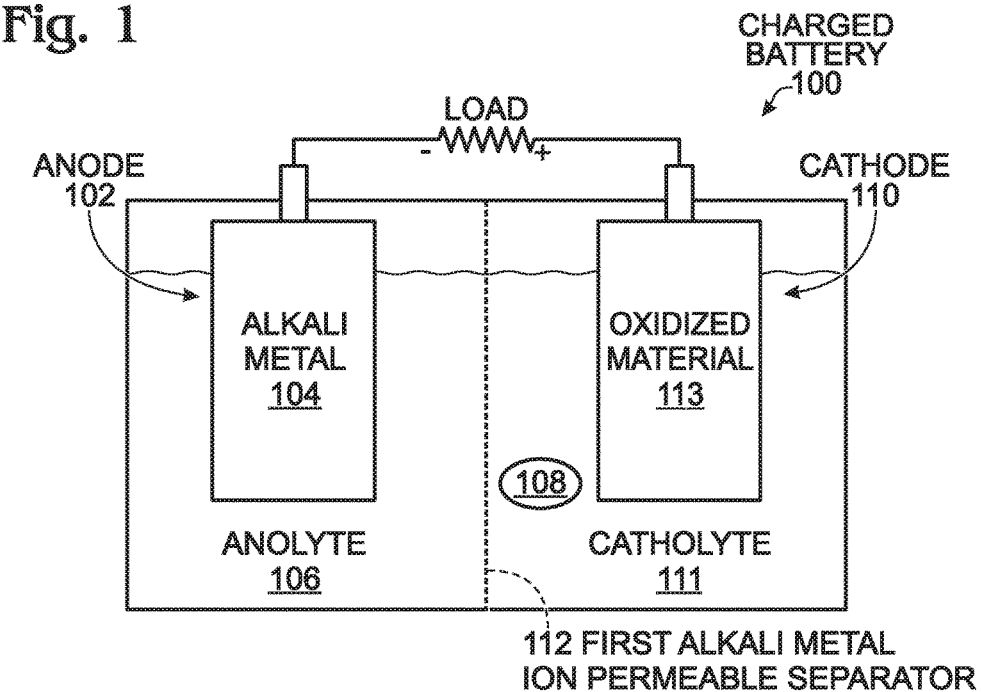
FIG. 1 is a partial cross-sectional view of a charged alkali/oxidant battery.

FIG. 1 is a partial cross-sectional view of a charged alkali/oxidant battery. The battery 100 comprises an anode 102 including a reduced first alkali metal 104, in the battery charged state, and an anolyte 106. The battery 100 further comprises a cathode 110 including, in the battery charged state, an oxidized material 113 such as nickel oxyhydroxide (NiOOH), manganese(IV) oxide ($Mn^{(4+)}O_2$), or iron(III) oxyhydroxide ($Fe^{(3+)}(OH)_3$), and a catholyte 111 including a first alkali metal hydroxide 108. Here, the first alkali metal hydroxide is schematically represented as an oval element within the catholyte 111, for the sake of simplicity. These cathode materials are insoluble in water, to promote stable cycling. They have a well-defined potential associated with the redox couple, and a low molecular weight to promote a high energy density The catholyte may be aqueous because at the potential at which the redox occurs, water suffices, as it does not react or breakdown. Further, water is cheap and non-flammable, unlike organic electrolytes. A first alkali metal ion permeable separator 112 is interposed between the anolyte 106 and the catholyte 111. The anolyte typically includes an organic solvent, such as ethylene carbonate, diethyelene carbonate, or a mixture of the two. For example, a lithium salt, such as $LiPF_6$, when dissolved in a solvent, dissociates into $Li^+PF_6^-$.

The separator 112 is a permeable membrane placed between the anode 102 and cathode 110 to keep the two electrodes apart, preventing electrical short circuits, while allowing the transport of ionic charge carriers that are needed to close the circuit during the passage of current in the battery 100. The separator 112 may be a polymeric membrane forming a microporous layer. It is typically chemically and electrochemically stable with regard to the anolyte and catholyte materials.

Figure 2:
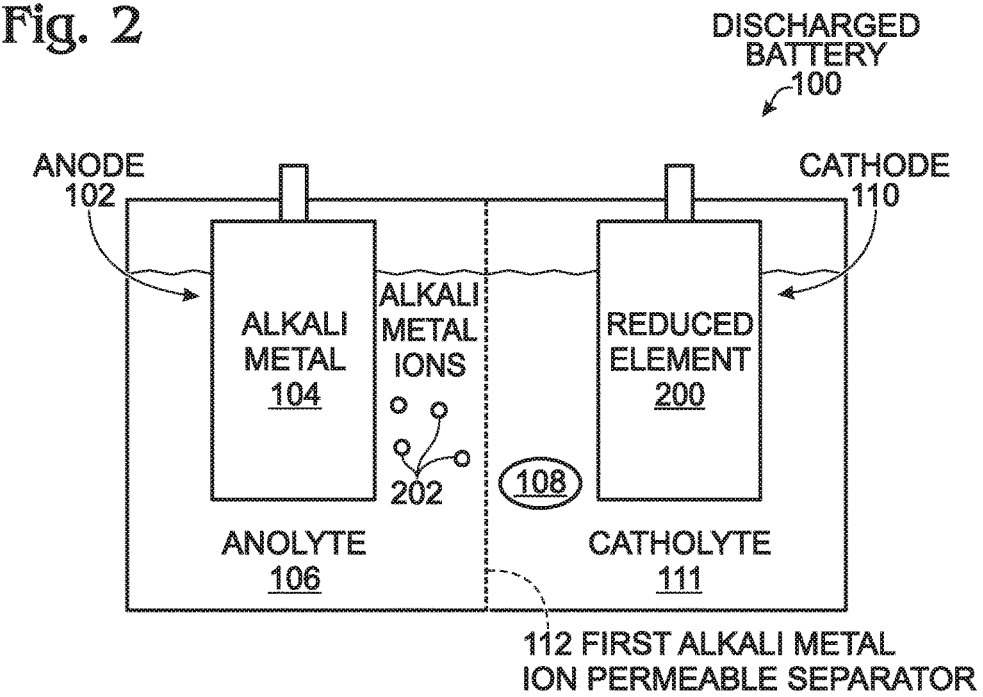
FIG. 2 is a partial cross-sectional view of the alkali/oxidant battery in the discharged state.

FIG. 2 is a partial cross-sectional view of the alkali/oxidant battery in the discharged state. As used herein, a battery is in a charged state when electrochemically active materials in the cathode are in an oxidized state and electrochemical materials in anode are in a reduced state. When a battery is in a discharged state, electrochemically active materials in the cathode are in a reduced state and electrochemical materials in the anode are in an oxidized state. Alternatively stated, a battery is charged when, upon providing an external connection through a load between the cathode and anode, spontaneous electrochemical reactions occur such that current flows from cathode to anode (or electrons from anode to cathode). Occurring simultaneously, these reactions reduce cathode active material and oxidize anode active material. Likewise, a battery is discharged when, upon providing an external connection through a load between the cathode and anode, no spontaneous electrochemical reactions occur and that no current flows from cathode to anode (or electrons from anode to cathode). Instead, an external source of power is required to force current to flow from anode to cathode (or electrons from cathode to anode) to reverse the otherwise spontaneous reactions in a charged battery.

Generally, the battery 100 operates as a result of redox reactions involving oxidation, which is the loss of electrons or an increase in oxidation state by a molecule, atom, or ion, and reduction, which is the gain of electrons or a decrease in oxidation state by a molecule, atom, or ion. In one case, referencing both FIGS. 1 and 2, the cathode 110 includes a reduced element 200, such as nickel(II) hydroxide (Ni$(OH)_2$) in the battery discharged state and an oxidized element 113, such as NiOOH, in the battery charged state. To continue the example, the anolyte 106 may include alkali metal ions 202, such as lithium ions ($Li^+$), in the battery discharged state. More generally, the anolyte 106 in the battery discharged state includes alkali metals ion 202 such as lithium ions ($Li^+$), sodium ions ($Na^+$), or potassium ions ($K^+$). In the battery charged state, the anode 102 includes a solid phase reduced alkali metal 104, respectively Li, Na, or K.

In other examples, the cathode 110 includes manganese (IV) oxide ($Mn^{(4+)}O_2$) 113 in the battery charged state and manganese (III) oxyhydroxide ($Mn^{(+3)}OOH$) 200 in the battery discharged state. Alternatively, the cathode 110 includes $Fe^{(3+)}(OH)_3$ 113 in the battery charged state and iron(II) oxyhydroxide ($Fe^{(2+)}(OH)_2$) 200 in the battery discharged state.

When the cathode 110 in the battery charged state is NiOOH, it progresses from the battery charged state to the battery discharged state with the following reaction:

$$NiOOH+H_2O+e^-=Ni(OH)_2+OH^-.$$

When the cathode 110 in the battery charged state is $Mn^{(4+)}O_2$, it progresses from the battery charged state to the battery discharged state with the following reaction:

$$Mn^{(4+)}O_2+H_2O+e^- \rightarrow Mn^{(3+)}OOH+OH^-.$$

When the cathode 110 in the battery charged state is $Fe^{(3+)}(OH)_3$, it progresses from the battery charged state to the battery discharged state with the following reaction:

$$Fe^{(3+)}(OH)_3+e^- \rightarrow Fe^{(2+)}(OH)_2+OH^-.$$

FIGS. 1 and 2 depict the alkali/oxidant battery with an active material solid phase anode and active material cathode. By "active material" it is meant that anode 102 and cathode 110 react, respectively, with the anolyte 106 and catholyte 111 in the redox reactions that enable the battery to charge and discharge. Although not explicitly shown, the anode 102 and cathode 110 may be formed overlying a current collector. In this example, the anode 102 is a reduced solid phase alkali metal 104 such as Li, Na, or K when the battery is in the charged state. Further, the cathode 110 includes $Mn^{(4+)}O_2$ 113 in the battery charged state and $Mn^{(+3)}OOH$ 200 in the battery discharged state. Alternatively, the cathode 110 includes $Fe^{(3+)}(OH)_3$ 113 in the battery charged state and $Fe^{(2+)}(OH)_2$ 200 in the battery discharged state. In another aspect, the cathode 110 in the battery charged state is NiOOH 113, and in the battery discharged state it is $Ni(OH)_2$ 200. For example, $Ni(OH)_2$ powder may be mixed with a binder (a polymer) and a conductive carbon (carbon black or graphite or carbon fiber) in water to form a paste that is applied to current collector (nickel foil or nickel foam). The cathode is pressed and heated to dry out water. The cathode 110 is referred to herein as "solid", but it has microscopic pores into which catholyte 111 penetrate via capillary force.

Figure 3A:
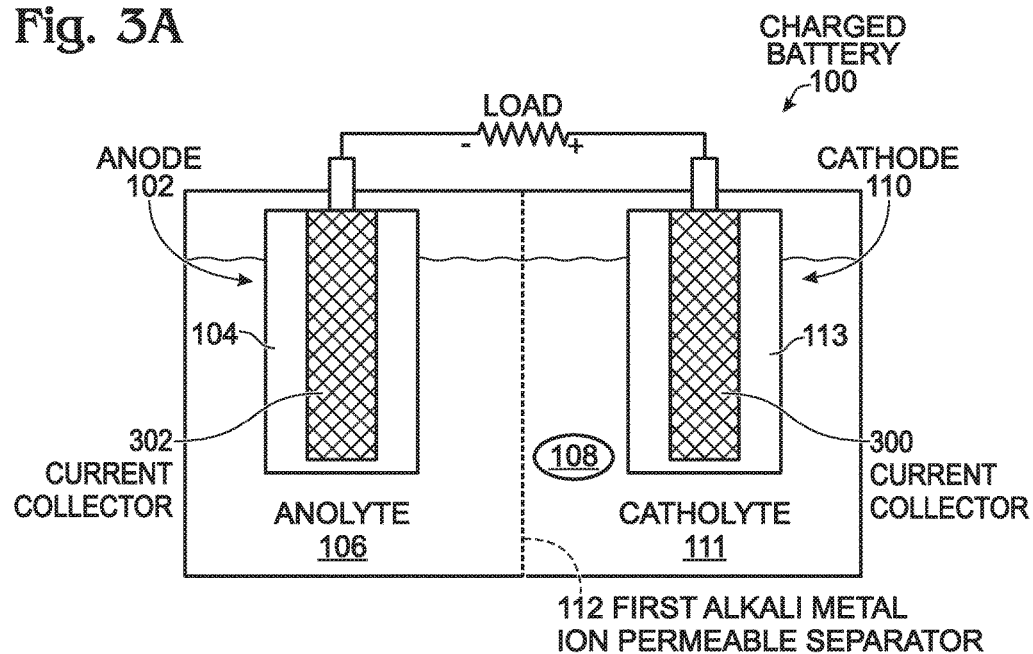
FIGS. 3A and 3B are partial cross-sectional views depicting an alkali/oxidant battery where the anode is a material dissolved in the anolyte.
Figure 3B:
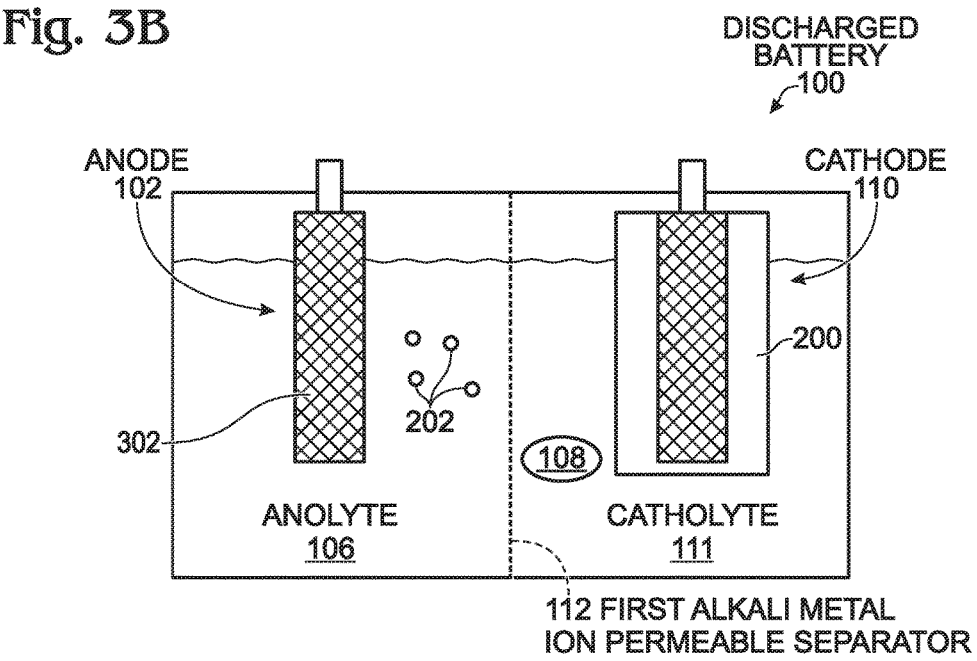

FIGS. 3A and 3B are partial cross-sectional views depicting an alkali/oxidant battery where the anode is a material dissolved in the anolyte. The cathode 110 and catholyte 111 are as described above in the explanation of FIGS. 1 and 2, except a cathode current collector 300 is explicitly shown. In this aspect, the anode in the battery charged state (FIG. 3A) comprises reduced alkali metal 104 (i.e. Li, Na, or K) formed on current collector 302. In the battery discharged state, alkali metal ions 202 (i.e. Li+, Na+, or K+) are dissolved in the anolyte 106. In the battery discharged state, no alkali metal necessarily adheres on the current collector 302.

FIGS. 4A and 4B are partial cross-sectional views of an alkali/oxidant battery where the catholyte and cathode are the same element, comprising a cathode slurry. A cathode current collector 300 is submerged in the cathode slurry 110/111. In these figures, the anode 102 and anolyte 106 are the same as described above in the explanation of FIGS. 1 and 2, and the explanations are not repeated in the interest of brevity. A cell 400 comprises the anode 102, the anolyte 106, the first alkali metal ion permeable separator 112, an input port 402 and an output port 404. A cathode slurry reservoir 406 is connected to the cell input 402 and output 404 ports to supply an oxidized cathode slurry 113 in the battery charged state (FIG. 4A), or to maintain a charge under an electrical load, and a reduced cathode slurry 200 when the battery is the discharge state (FIG. 4B), or when t being electrically charged. For the sake of simplicity, the oxidized cathode slurry 113 and reduced cathode slurry 200 are schematically represented as ovals within the cathode slurry 110/111.

FIGS. 5 and 6 are partial cross-sectional views of an alternative alkali/oxidant battery using a cathode slurry. In these figures, the anode 102 and anolyte 106 are the same as described above in the explanation of FIGS. 3A and 3B, and the explanations are not repeated in the interest of brevity. A cell 400 comprises the anode 102, the anolyte 106, the first alkali metal ion permeable separator 112, an input port 402 and an output port 404. A cathode slurry reservoir 406 is connected to the cell input 402 and output 404 ports to supply an oxidized cathode slurry 113 in the battery charged state (FIG. 5), to maintain a charge under an electrical load, and a reduced cathode slurry 200 when the battery is in the discharge state (FIG. 6), or when it is being electrically charged.

Figure 7:
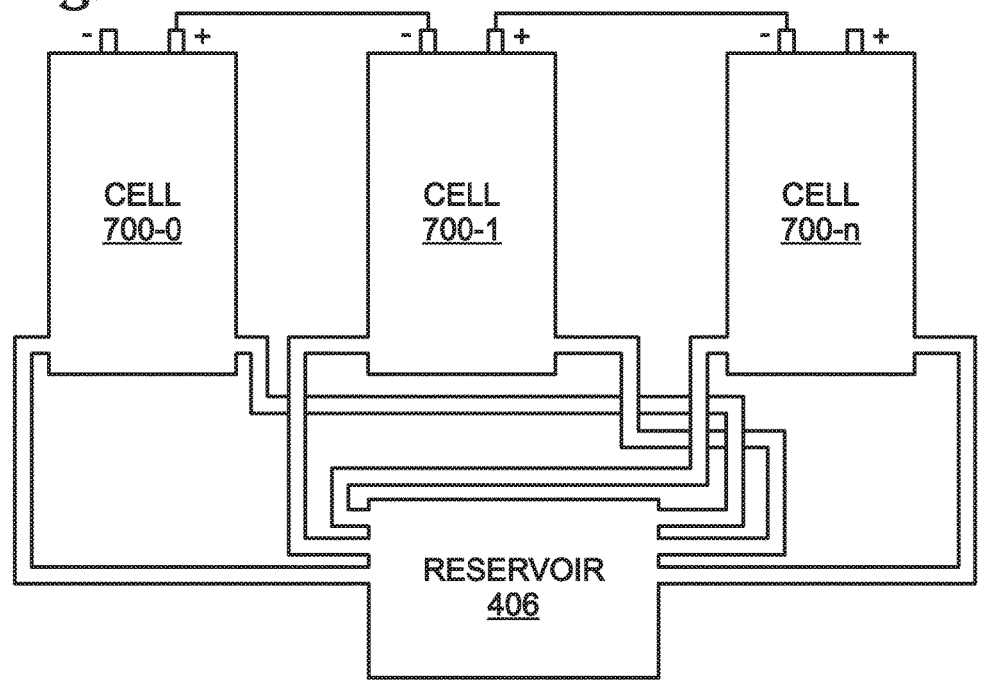
FIG. 7 is a schematic block diagram depicting a plurality of cells.

FIG. 7 is a schematic block diagram depicting a plurality of cells. Shown are cells 700-0 through 700-n, where n is an integer greater than one, but not otherwise limited to any particular value. The cells 700-0 through 700-n are shown electrically connected in series, but alternatively (not shown), they may be electrically connected in parallel. In one aspect, as shown, the cathode slurry reservoir 406 and the plurality of cells 700-0 through 700-n are connected in parallel to transport the cathode slurry 110/111. Alternatively but not shown, the cells may be connected in series with the slurry reservoir.

Figure 8:
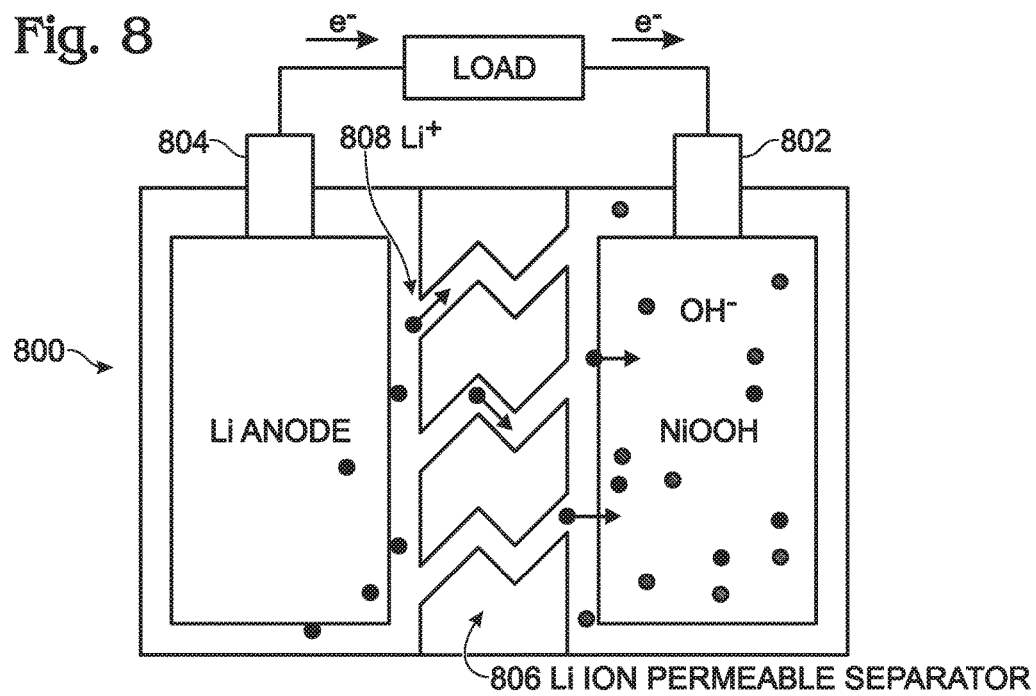
FIG. 8 is a partial cross-sectional schematic block diagram depicting the alkali/oxidant battery from a different perspective.

FIG. 8 is a partial cross-sectional schematic block diagram depicting the alkali/oxidant battery from a different perspective. In one aspect as shown, NiOOH is used as the cathode material 802 in a lithium/nickel battery 800. The battery 800 comprises a lithium metal anode 804 and a NiOOH cathode 802 separated by a Li-ion permeable separator 806 that conveys Li-ions 808 between anode 804 and cathode 802 sides. The lithium/NiOOH battery 800 has to be discharged after initial assembly, with the electrochemical reactions:

anode side: $Li=Li^++e^-$;

cathode side: $NiOOH+H_2O=e^-=Ni(OH)_2+OH^-$.

overall reaction: $Li+NiOOH+H_2O=Ni(OH)_2+LiOH$.

Unlike the lithium/$Ni(OH)_2$ battery associated with reference 4 (H. Li et al.), and described in the Background Section above, whose capacity is limited by the Li-ion concentration in electrolyte, the capacity of Li/NiOOH battery of FIG. 8 is only determined by the active materials in the electrodes. Specifically, for reference 4, the anode is Li, cathode is $Ni(OH)_2$, and the electrolyte has LiOH. The first reaction after battery assembly must be the process of charging the battery. During the charge process, the LiOH in the electrolyte is dissociated, $Li^+$ moves to the anode side and becomes plated on the Li metal anode, $OH^-$ ions react with $Ni(OH)_2$, resulting in NiOOH and $H_2O$. The capacity of the battery is determined by the amount of LiOH added to the liquid electrolyte.

In battery 800, the anode is Li metal and the cathode is NiOOH. Unlike the above-mentioned prior art battery (reference 4), the first reaction after battery assembly is to discharge battery 800. The Li+ dissolves into analyte at the anode side and moves to cathode side. The cathode material NiOOH reacts and results in $Ni(OH)_2$. The battery capacity is limited by the original amount of Li or NiOOH present when the battery is fabricated. Since the Li has very large capacity (>3000 mAh/g), greater than the LiOOH cathode (261 mAh/g), the Li/NiOOH battery capacity is determined by the original amount of NiOOH at the cathode. Therefore, the initially charged battery with NiOOH cathode has a much higher capacity than that one in reference 4, that is initially discharged with a $Ni(OH)_2$ electrode and a LiOH liquid electrolyte.

Figure 9:
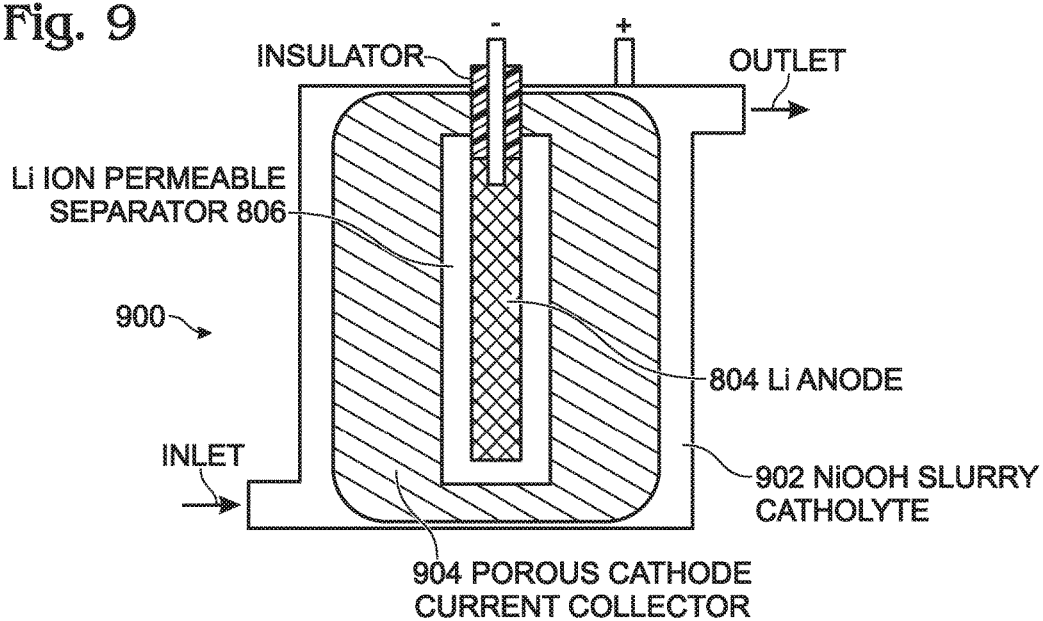
FIG. 9 is a partial cross-section schematic block diagram depicting a flowthrough battery with a cathode slurry.

FIG. 9 is a partial cross-section schematic block diagram depicting a flowthrough battery with a cathode slurry. Once the NiOOH of battery 800 is attached onto a current collector at assembly, the battery capacity is fixed. In order to increase the battery capacity further, the flowthrough battery 900 of FIG. 9 forms NiOOH as a slurry catholyte 902 that can be fed into the cathode current collector 904 to match the high capacity of lithium anode 804. Carter and Chiang (reference 5, see Background Section), disclosed the use of a flowable slurry as the electrode materials in batteries. However, their battery with a $LiCoO_2$ slurry catholyte demonstrated 0.36 Li-ion reversibly inserting/extracting into/from a $LiCoO_2$ molecule between 2 V and 4.5 V, corresponding to a capacity of 99 mAh/g, much smaller than that of NiOOH, which is 261 mAh/g. The flowthrough Li/NiOOH battery 900 consists of lithium anode 804, and a cathode compartment separator of a Li-ion permeable membrane or a Li-ion conducting solid electrolyte 806. During the discharge, NiOOH is reduced to $Ni(OH)_2$. If mechanically charged (the cathode slurry is refreshed with oxidized slurry from a reservoir), the battery 900 can continue to generate electric powder. Similarly, the anode compartment can be also easily disassembled for the anode to be replaced, realizing a mechanical charge in some aspects, the current collector 904 may additionally be comprised of the wall of the compartment containing the slurry.

Figure 10:
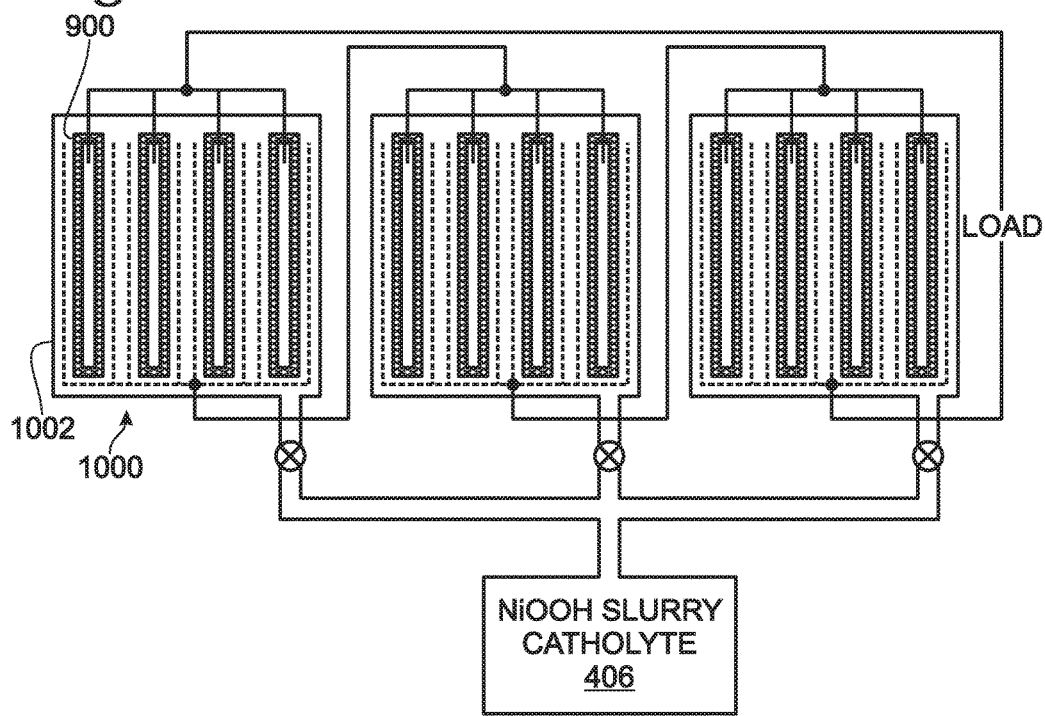
FIG. 10 is a partial cross-sectional schematic block diagram of several blocks of batteries connected by pipelines to a slurry reservoir.

FIG. 10 is a partial cross-sectional schematic block diagram of several blocks of batteries connected by pipelines to a slurry reservoir. Each block 1002 includes a plurality of flowthrough batteries 900 electrically connected in parallel. In order to obtain high voltage and high energy, the blocks 1002 can be electrically connected in series, as shown, to form battery stack 1000. Several blocks 1002 can be connected by the pipe lines in parallel (as shown) or series to circulate NiOOH slurry catholyte. Like the flowthrough Li/NiOOH battery of FIG. 9, the stack 1000 can also be mechanically charged with Li-anode replacement and NiOOH slurry catholyte replenishment.

Below is a summary of the battery configurations described in FIGS. 1 through 6:
1. Slurry cathode/solid, metallic anode
2. Solid cathode solid, metallic anode
3. Slurry cathode/anode material dissolved in anolyte
4. Solid cathode/anode material dissolved in anolyte There is no phase change for slurry or solid cathodes as they progress from reduced to oxidized state (and from oxidized to reduced states). For a battery to either discharge or charge (i.e. redox reactions occur together at the anode and cathode), the oxidation states of cathode and anode must be opposite.

TABLE 1

| Battery with Ni slurry cathode/solid, metallic Li anode (1) | | | | |
|---|---|---|---|---|
| | Cathode side | | Anode side | |
| Process | Before | After | Before | After |
| Discharging | NiOOH (oxidized) | $Ni(OH)_2$ (reduced) | Li (reduced-a solid) | $Li^+$ (oxidized-dissolved in electrolyte) |
| Charging | $Ni(OH)_2$ (reduced) | NiOOH (oxidized) | $Li^+$ (oxidized-dissolved in electrolyte) | Li (reduced-a solid) |

During discharge, slurry cathode enters in an oxidized state (NiOOH) and the anode is metallic Li (in reduced state). Slurry leaves in a reduced state ($Ni(OH)_2$). Subsequently, the battery can be charged by reversing the flow of slurry, i.e., $Ni(OH)_2$ enters in reduced state and leaves in oxidized state (NiOOH). Metallic Li dissolves when it is oxidized, i.e., $Li^+$ is soluble in an aqueous electrolyte. The battery has a high capacity, determined by the amount of solid metal anode (as opposed to concentration of alkali metal ion in electrolyte solution, which would be much smaller).

TABLE 2

| Battery with Ni slurry cathode/anode material dissolved in anolyte (3). | | | | |
|---|---|---|---|---|
| | Cathode side | | Anode side | |
| Process | Before | After | Before | After |
| Charging | $Ni(OH)_2$ (reduced) | NiOOH (oxidized) | $Li^+$ (oxidized-dissolved in electrolyte) | Li (reduced-a solid) |
| Discharging | NiOOH (oxidized) | $Ni(OH)_2$ (reduced) | Li (reduced-a solid) | $Li^+$ (oxidized-dissolved in electrolyte) |

As previously mentioned, metallic Li dissolves when it is reduced, i.e., $Li^+$ is soluble in an aqueous electrolyte. So it is possible to build a battery with no solid anode, just a current collector of suitable material. The metal ions (oxidized) are dissolved in anolyte solution. During charge, slurry cathode enters in a reduced state ($Ni(OH)_2$) as the anode is oxidized. Slurry leaves in oxidized state (NiOOH). Subsequently, the battery can be discharged by reversing the flow of slurry, i.e., NiOOH enters in oxidized state and leaves in reduced state ($Ni(OH)_2$). Metallic Li plates on the current collector when it is reduced. The battery capacity is determined by concentration of metal ions in the electrolyte solution.

Figure 11:
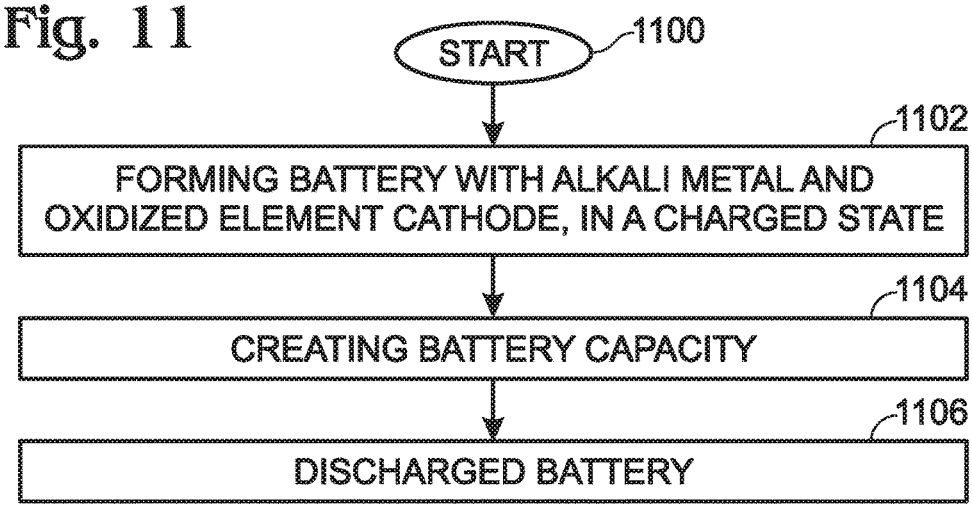
FIG. 11 is a flowchart illustrating a method for creating alkali/oxidant battery capacity.

FIG. 11 is a flowchart illustrating a method for creating alkali/oxidant battery capacity. Although the method is depicted as a sequence of numbered steps for clarity, the numbering does not necessarily dictate the order of the steps. It should he understood that some of these steps may be skipped, performed in parallel, or performed without the requirement of maintaining a strict order of sequence. Generally however, the method follows the numeric order of the depicted steps. The method starts at Step 1100.

Step 1102 forms battery in a charged state having a first alkali metal anode, an anolyte, a first alkali metal on permeable separator, and a cathode including an oxidized element. The oxidized element may be nickel oxyhydroxide (NiOOH), manganese(IV) oxide ($Mn^{(4+)}O_2$), or iron(III) oxyhydroxide ($Fe^{(3+)}(OH)_3$). The battery further comprises a catholyte including a first alkali metal hydroxide. In one aspect, the cathode and catholyte are a cathode slurry. Step 1104 creates a first battery capacity, where the first battery capacity is responsive to the amount of oxidized element in the cathode and reduced first alkali metal at the anode.

In one aspect, Step 1102 forms a battery, m the charged state, with a NiOOH cathode, and a reduced first alkali metal (X) anode, where X is lithium (Li), sodium (Na), or potassium (K). Then, Step 1006 discharges the battery by performing the following reactions:

anode: $X=X^+ + e^-$ and, cathode: $NiOOH + H_2O + e^- = Ni(OH)_2 + OH^-$.

In another aspect, Step 1102 forms a battery, in the charged state, with a $Mn^{(4+)}O_2$ cathode, and a reduced first alkali metal (X) anode, where X is Li, Na, or K. Then, discharging the battery in Step 1106 includes performing the following reactions:

anode: $X=X^+ + e^-$ and, cathode: $Mn^{(4+)}O_2 + H_2O + e^- \rightarrow Mn^{(3+)}OOH + OH^-$.

In yet another aspect, Step 1102 forms a battery, in the charged state, with a $Fe^{(3+)}(OH)_3$ cathode, and a reduced first alkali metal (X) anode, where X is Li, Na, or K. Then, discharging the battery in Step 1106 includes performing the following reactions:

anode: $X=X^+ + e^-$ and, cathode: $Fe^{(3+)}(OH)_3 + e^- \rightarrow Fe^{(2+)}(OH)_2 + OH^-$.

In one aspect, discharging the battery in Step 1106 includes forming the anolyte with lithium ions ($Li^+$), sodium ions ($Na^+$), or potassium ion ($K^+$) dissolved in the anolyte.

An alkali/oxidant battery has been provided along with an associated method for creating a battery capacity. Examples of materials and slurry flow configurations have been presented to illustrate the invention. However, the invention is not limited to merely these examples. Other variations and embodiments of the invention will occur to those skilled in the art.

The invention claimed is:

1. An alkali/oxidant battery comprising:
an anode including a reduced first alkali metal in a battery charged state;
an anolyte;
a cathode including, in the battery charged state, iron(III) oxyhydroxide ($Fe^{(3+)}(OH)_3$);
a catholyte including a first alkali metal hydroxide; and,
a first alkali metal ion permeable separator interposed between the anolyte and the catholyte.

2. The alkali/oxidant battery of claim 1 wherein the anolyte includes lithium ions ($Li^+$) in the battery discharged state.

3. The alkali/oxidant battery of claim 1 wherein the catholyte and cathode are the same element, comprising a cathode slurry; and,
the cathode further comprising a cathode current collector submerged in the cathode slurry.

4. The alkali/oxidant battery of claim 3 further comprising:
a cell comprising the anode, the anolyte, the first alkali metal ion permeable separator, an input port and an output port;
a cathode slurry reservoir connected to the cell input and output ports to supply an oxidized cathode slurry when the battery is electrically discharging under load and a reduced cathode slurry when the battery is being electrically charged.

5. The alkali/oxidant battery of claim 4 further comprising:
a plurality of cells connected in a configuration selected from a group consisting of series and parallel electrical connections.

6. The alkali/oxidant battery of claim 5 wherein the cathode slurry reservoir and the plurality of cells are connected in parallel to transport the cathode slurry.

7. The alkali/oxidant battery of claim 1 wherein the anolyte in the battery discharged state includes alkali metal ions selected from a group consisting of lithium ions ($Li^+$), sodium ions ($Na^+$), and potassium ions ($K^+$); and,
wherein the anode, in the battery charged state, includes a solid phase reduced alkali metal respectively selected from a group consisting of Li, Na, and K, overlying a current collector.

8. The alkali/oxidant battery of claim 1 wherein the cathode includes ($Fe^{(3+)}(OH)_3$) in the battery charged state and iron(II) oxyhydroxide ($Fe^{(2+)}(OH)_2$) in the battery discharged state.

9. The alkali/oxidant battery of claim 1 wherein the cathode in the battery charged state is $Fe^{(3+)}(OH)_3$, and progresses from the battery charged state to the battery discharged state with the following reaction:

$Fe^{(3+)}(OH)_3 + e^- \rightarrow Fe^{(2+)}(OH)_2 + OH^-$.

10. The alkali/oxidant battery of claim 1 wherein the anode in the battery charged state is selected from a group consisting of a solid phase reduced first alkali metal and a solid phase reduced first alkali metal overlying a current collector.

11. A method for creating alkali/oxidant battery capacity, the method comprising:
forming a battery in a charged state having a first alkali metal anode, an anolyte, a first alkali metal ion permeable separator, and a cathode comprising iron(III) oxyhydroxide ($Fe^{(3+)}(OH)_3$), and a catholyte including a first alkali metal hydroxide; and,
creating a first battery capacity, where the first battery capacity is responsive to an amount of oxidized element in the cathode and reduced first alkali metal at the anode.

12. The method of claim 11 wherein forming the battery includes forming, in the charged state, a $Fe^{(3+)}(OH)_3$ cathode, and a reduced first alkali metal (X) anode, where X is selected from a group consisting of Li, Na, and K; and,
the method further comprising:
discharging the battery by performing the following reactions:

anode: $X=X^+ + e^-$ and, cathode: $Fe^{(3+)}(OH)_3 + e^- \rightarrow Fe^{(2+)}(OH)_2 + OH^-$.

13. The method of claim 11 further comprising:
discharging the battery by forming the anolyte including ions selected from a group of first alkali metals consisting of lithium ions ($Li^+$), sodium ions ($Na^+$), and potassium ion ($K^+$) dissolved in the anolyte.

14. The method of claim 11 wherein forming the battery includes the cathode and catholyte being a cathode slurry.

* * * * *